APPARATUS FOR ACCUMULATING NUMERICAL DATA

Filed Sept. 22, 1958 4 Sheets-Sheet 1

INVENTOR.
ROBERT M. GOODMAN
BY
Busser, Smith & Harding
ATTORNEYS

INVENTOR.
ROBERT M. GOODMAN
BY
ATTORNEYS

March 6, 1962 R. M. GOODMAN 3,023,957

APPARATUS FOR ACCUMULATING NUMERICAL DATA

Filed Sept. 22, 1958 4 Sheets-Sheet 3

INVENTOR.

ROBERT M. GOODMAN

BY

ATTORNEYS

March 6, 1962 R. M. GOODMAN 3,023,957

APPARATUS FOR ACCUMULATING NUMERICAL DATA

Filed Sept. 22, 1958 4 Sheets-Sheet 4

INVENTOR.
ROBERT M. GOODMAN
BY
Fusser, Smith & Harding
ATTORNEYS 3,023,957
APPARATUS FOR ACCUMULATING NUMERICAL DATA

Robert M. Goodman, % American Electronic Laboratories, Inc., 121 N. 7th St., Philadelphia, Pa.

Filed Sept. 22, 1958, Ser. No. 762,449
12 Claims. (Cl. 235—92)

This invention relates to apparatus for accumulating numerical data and has particular reference to apparatus involving high speed electromagnetically operated counters.

At the present time, computing and data processing devices are in wide-spread use involving complicated electronic devices for computation and memory. Such devices are far too expensive for many uses, but, on the other hand, simpler mechanical devices do not lend themselves readily to electrical controls, nor to the provisions of electrical outputs, and quite generally have been designed for the performance of specific functions. In many cases the very high speeds of operation of electronic devices are not required and consequently if they are used their capabilities, arrived at through expensive and complicated construction, are very ineffectively utilized.

In accordance with the present invention there is basically provided a simple, low inertia electromechanical counter capable of relatively high speed operation as compared with mechanically operated counters and particularly adapted to both control by electrical signals and to the provision of electrical outputs. In particular, the type of counter here involved is adapted to accumulate numerical data in a minimum of signal intervals. It provides, furthermore, a static accumulation of information which may be taken therefrom and utilized in other devices.

As an example of a system to which the invention pertains, and which constitutes part of the invention, reference may be made to a read out arrangement which may be used to secure accumulations of numerical data from a number of devices such as vending machines, cash or value registering devices, or the like. Using vending machines as a simple example, there may be distributed throughout some territory a large number of such machines the total sales of which it may be desirable to ascertain. While such machines may involve simple counters registering their operations, the reading of such counters visually and the making of written records is subject to human error and is time consuming. In accordance with the present invention, a man may carry a portable device and may plug it into one machine after the other with automatic registering therein of the accumulated totals from the individual machines. In similar fashion, registration may be made of such devices as cash registers which may be distributed throughout department stores or the like. Records may similarly be taken from ticket issuing machines such as those used for the issuance of transportation, race track, admission or other tickets.

The general objects of the invention just indicated as well as others relating to details of construction and operation will become apparent from the following description, read in conjunction with the accompanying drawings in which.

Figures 1, 2, 3:
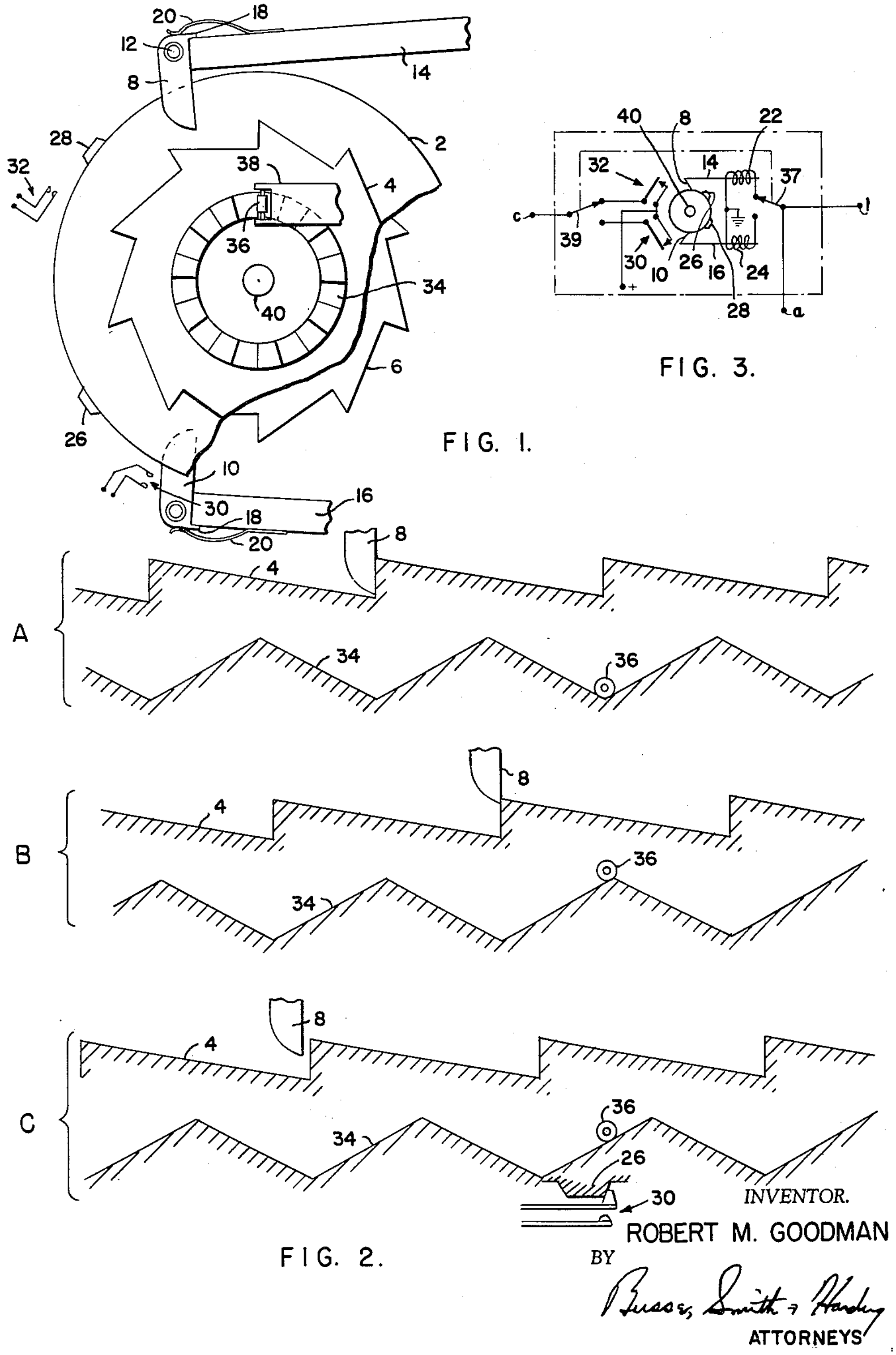
FIGURE 1 is a diagrammatic mechanical view showing the construction of a counting device provided in accordance with the invention.
FIGURE 2 is a diagram illustrative of the operation of the counter and, in particular, indicating how carrying from one order to another may be effected.
FIGURE 3 is a diagram particularly illustrating the electrical connections of the counter.

A preferred form of counter is illustrated in FIGURE 1, and diagrammed in FIGURE 3. Referring to FIGURE 1, it comprises a drum 2 on the periphery of which there may be exhibited the digits 0 to 9 uniformly spaced. However, if the counter is not to be visually read, but is merely adapted to provide for transmission of digital information this drum may be omitted. Desirably the drum and other rotating parts of the counter are made as light and as small as possible or convenient for a particular use, and these parts may be made of molded plastic with their weights further reduced by the provision of open spaces wherever possible. In accordance with the invention it is generally desirable to have the counter count both forwards and backwards, and for this purpose secured either to the drum 2 or its shaft are a pair of oppositely arranged ratchets 4 and 6 arranged to be stepped about by pawls 8 and 10 which are pivoted at 12 to links or plungers 14 and 16, respectively. Each of the pawls is provided with an ear 18 to limit its movement with respect to its link or plunger in a direction toward the left as viewed in FIGURE 1, springs 20 being provided to cause the pawls to assume normally the positions illustrated, though arranged to yield to permit the pawls to rock over and clear the teeth of the ratchet during return movements. Individual solenoids 22 and 24, diagrammed in FIGURE 3, may be provided in any convenient fashion to move the links or plungers 14 and 16 toward the right as viewed in FIGURE 1. Return springs, not shown, are provided to move the links or plungers toward the left. In order to provide carrying pulses, the drum 2 or its rotating equivalent is provided with cam projections 26 and 28 which are respectively arranged to effect closure of switches 30 and 32 in a fashion hereafter described, the cams and switches being in two separate radial planes so that each cam projection operates only one switch.

Carried by the rotating assembly, i.e., by one of the rotating elements described or by the shaft, is an element 34 having a serrated form providing peaks and sockets, there being ten sockets evenly indexed thereabout for engagement by a roller or other detent 36 forced into seated position by a spring 38 mounted on a fixed support. This detent arrangement is arranged to index the teeth of the ratchets 4 and 6 in predetermined relationships to the pawls 8 and 10.

Stepping is accomplished by the application of short duration pulses to the respective solenoids 22 and 24, selection for forward and reverse stepping being effected by selective positioning of a switch 37 which is connected to two terminals *a* and *b*, the former serving for the introduction of pulses from a source external to a counter assembly, while the latter serves for the introduction to one counter of carry pulses originating in a counter of preceding order. Carry pulses from each counter are selectively delivered to a terminal *c* through the selecting switch 39. For purposes of simplicity of description it will be assumed that the introduced pulses and carry pulses are uniformly positive, and the two switches 30 and 32 and the selecting switch 39 are merely provided for securing proper phasing of carry pulses as will appear shortly. It will be evident that using a polarized relay system forward and reverse counting may well be effected by the use of pulses of one sign for forward counting and pulses of opposite sign for reverse counting, such operation entailing obvious changes in the circuitry. It will also be obvious that by using a polarized system a single pawl operating plunger may be used for forward and reverse counting.

Using light weight parts and providing minimum inertia makes possible counting at very high pulse repetition rate and also practical carrying between successive staged counters. The operation may be best described by reference to FIGURE 2 which illustrates diagrammatically the sequence of operations involved in a counter receiving both external pulses and carry pulses. Referring first to the diagram at A, the forward operating ratchet 4 and the detent engaging element 34 are shown in their rest positions, the detent roller 36 then engaging a trough in the element 34. When the counter is idle the pawl 8 will occupy a position clearing the path of the edges of the ratchet teeth. The illustrated position of this pawl is that at which it first engages a tooth of ratchet 4 under the pulse excitation of the solenoid 22. The movement of this pawl is very rapid under the solenoid action and it will move from its idle position to its extreme active position illustrated in diagram B in which position it is about to disengage a tooth, having advanced the ratchet and detent element 34 from the positions illustrated at A to those illustrated at B. The pawl 8 may move somewhat further, but its position in B indicates the limit of its necessary movement. As shown, this results in a positioning of the detent element 34 so that the detent roller 36 is located on the opposite side of the peak relative to that side on which the roller was previously seated.

The short duration pulse in solenoid 22 may well have terminated before the pawl 8 reaches the position illustrated at B, inertia being relied upon to carry the rotary elements to the positions illustrated and the pawl to its illustrated position. Upon deenergization of the solenoid 22 the pawl will be very quickly returned toward the left by spring action, while the rotating elements continue to move toward the right as illustrated. As this motion continues, the roller 36 will insure further right hand movement of the ratchet as illustrated at C, with the pawl 8 assuming, at the phase of operation illustrated at C a position slightly to the left of the next tooth of the ratchet over which it may pass freeely due to the yielding of spring 20. The carry cam 26 in the position illustrated at C is just about to close the switch 30, assuming that the movements involved correspond to a transition from a reading of 9 to a reading of 0. During the further movement of the rotating parts the cam 26 will close the switch 30 and then effect reopening thereof before the roller is again seated in a trough. The carry pulse thus produced will be delivered to the next counter which may be either in its rest position (as at A) or also in the same advancing position as the ratchet under consideration. In the former case, it will have a step imparted thereto. In the latter case, it will have an additional step imparted thereto since its pawl 8 will have dropped beyond the next tooth, it being assumed, as will be later pointed out, that external pulses operating various ratchets of a group are emitted simultaneously.

The result, then, is that in each complete cycle of advance of a counter there is first a period in which the counter may receive an external pulse followed by a period in which it may receive an additional carrying pulse from another counter. In the former case, there will be one step of advance in a complete cycle. In the latter case, there will be two steps of advance in a complete cycle. Proper counting and carrying thus occur.

It will be evident that reverse counting effected by operation of pawl 10 occurs in the same fashion, the diagrams in FIGURE 2 being applicable except for reversal of directions of movement. It will be now evident that in view of the phasing relationships involved two switches 30 and 32 rather than a single switch must be provided if they are operated by cams carried by the rotating elements. In other words, the carrying pulses resulting from respective forward and reverse advance steps must correspond to positions of the roller 36 on opposite slopes of the detent engaging element 34. A single physical cam 26 may, of course, be provided if switches corresponding to 30 and 32 are properly displaced for operation thereby, the switch at 39 being selectively positioned to render one or the other electrically inoperative even though both may be mechanically closed. Changes in details in these and other respects are evidently merely a matter of design convenience.

From the foregoing it will be clear that there is provided a counter which may be associated with other counters and which is susceptible to very high speed of stepping and high repetition rates of actuating pulses. Consistent with this reliable carrying may be effected. While the counter is herein disclosed as a decimal counter, it will be evident that counting in other systems may be employed, for example to take care of proper counting in non-decimal monetary systems, and that alphanumeric operations in general may be carried out. The steps of the counters may also have other than numerical significance, e.g., alphabetical significance.

Figures 4, 5:
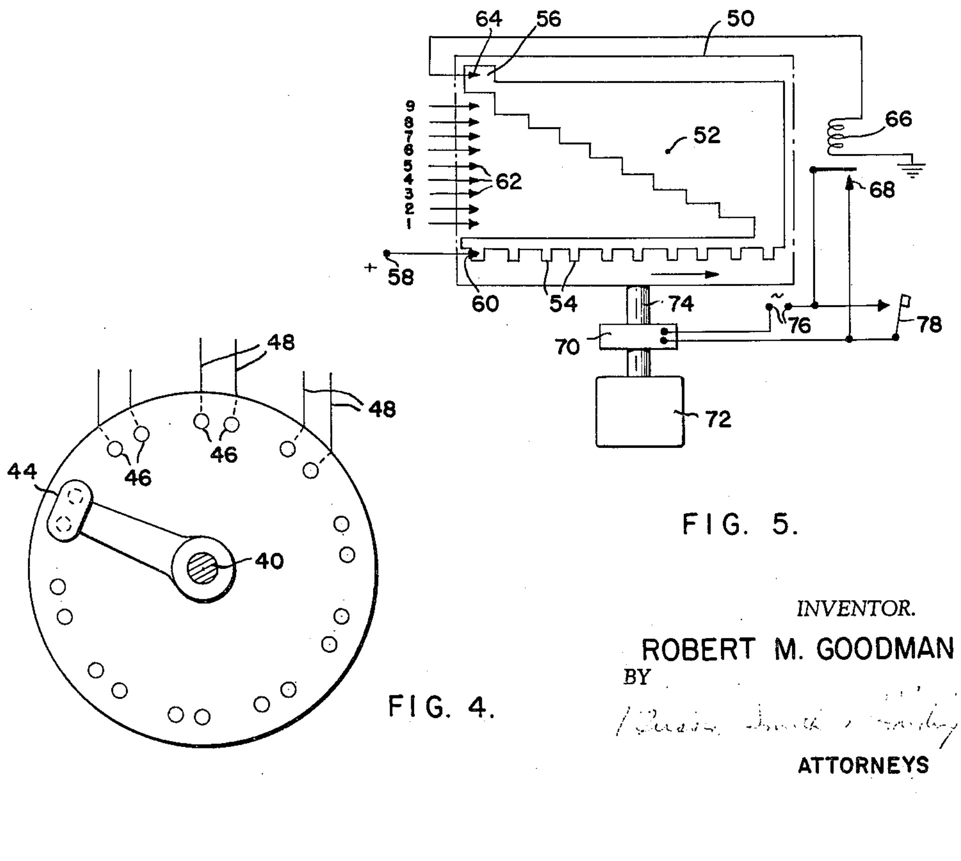
FIGURE 4 is an elevation, partially diagrammatic, showing a type of information accumulator from which electrical signals may be provided.
FIGURE 5 is a developed diagrammatic view illustrating a pulser provided in accordance with the invention.

It is particularly desirable in many instances to provide for the readout of information from a counter. FIGURE 4 illustrates how this may be done, simultaneously providing for extensive freedom of routing of information. The shaft 40 of a counter has attached thereto an arm 42 carrying a conductive shorting wiper 44 arranged to short contacts of pairs 46 carried by a fixed member and provided with external connections 48. The wiper is so arranged that on each step it will short a pair of contacts corresponding to each step of the counter. By providing the pairs of contacts the various leads may be maintained independent so that they may be connected to quite different elements of associated circuitry. In many cases, of course, the corresponding elements of the pairs of all sets may have a common connection equivalent to an arrangement in which the wiper 44 might have an external connection. Through the use of the arrangement shown in FIGURE 4, an output may be provided, for example, to a printer, the electrical connections being conventional for the particular printer used. Operation of the printer at the desired time may be controlled by its "Print" switch, either manually or automatically. It will be obvious that complements of the counter settings may be delivered from the readout switch. An example of this in securing zero resetting is described hereafter.

In many uses of the counters it is desirable to provide a pulser which will emit simultaneously trains of pulses in such fashion that in a cycle one train will consist of a single pulse and the others of numbers of pulses running from 2 to 9 (or more or less in the case of special symbolic operations), with simultaneity of groups of pulses on the various output channels to effect counter operations as already described. FIGURE 5 illustrates a satisfactory type of pulser. As shown, this comprises a drum 50 (illustrated in developed form). This drum of insulating material, is provided with a conductive area comprising a stepped area 52 and an extension providing short projecting areas 54 together with an extended area 56. Brushes 60, 62 and 64 are provided at various axial positions as illustrated. The brush 60 is connected to a power supply terminal 58 conventionally indicated as positive with respect to a reference ground of the pulser and the apparatus controlled thereby. The brush 60 is arranged to be engaged by the conductive areas 54 during rotation of the drum in the direction indicated by the arrow in FIGURE 5. Brushes 62 are respectively positioned to engage the various stepped portions of the area 52. A brush 64 is arranged to engage the area 56 and is connected to the winding 66 of a relay. This relay when energized opens a contact at 68. A magnetic clutch 70 couples a driving motor 72, which may be provided with suitable reduction gearing, to the drum shaft 74, the clutch being desirably of the type which when energized effects coupling between the motor and drum and when deenergized provides a brake to the drum to stop it very quickly. Such clutches are well known and need not be described in detail. Energization for the clutch may be derived from supply terminals 76 which provide either alternating or direct current as may be required. A starting button switch is provided at 78.

The operation of the pulser is as follows, assuming power on:

A rest position is illustrated in which the brush 64 engages the area 56 and the brush 60 engages the most left hand area 54 illustrated. Under these conditions the relay 66 is energized opening the contact at 68 so that the clutch 70 is released, though the motor 72 may be continuously running. When it is desired to effect a cycle of operation, the push button switch 78 is momentarily closed for a time sufficient only to cause the brush 60 to disengage the area 54 previously contacted thereby. Deenergization of the relay 66 occurs closing contact 68 in parallel with the push button switch 78 which may then be released. A single drum revolution then occurs, the drum being brought to rest when the connections are as illustrated in FIGURE 5 due to the contacts at 68. During this cycle short duration pulses may be emitted having durations corresponding to the circumferential extents of the areas 54. The first event will be the emission of a single pulse from each of the output channels. Next a second pulse is emitted from each of the output channels except the first. This progressive action continues, until finally a ninth pulse is emitted from only the last channel. As will shortly appear this leads to advantageous operations for various purposes.

Figure 6:
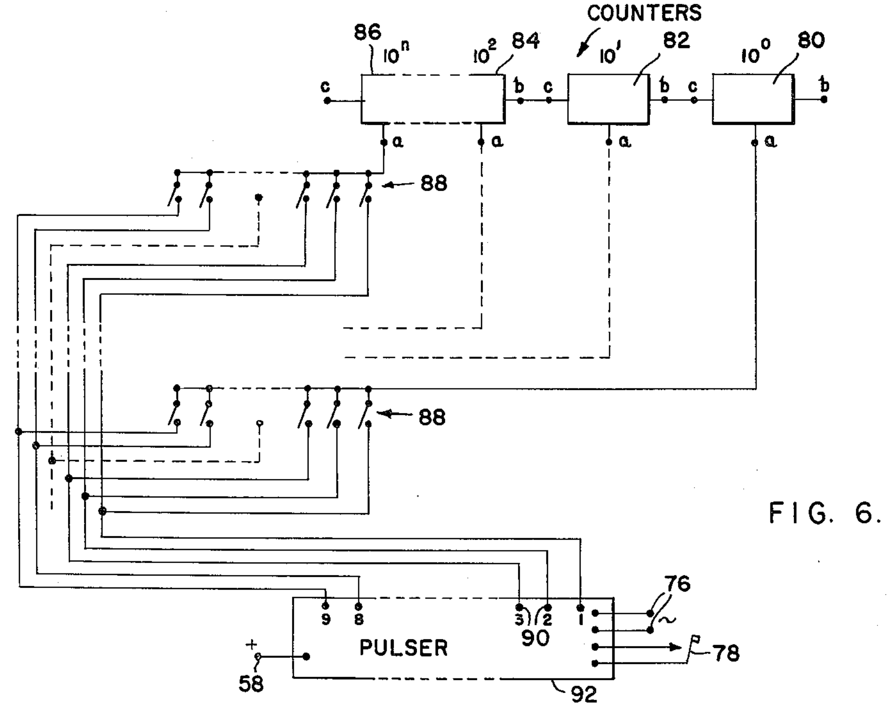
FIGURE 6 is a wiring diagram illustrating an arrangement for accumulating information in a series of counters.

FIGURE 6 illustrates the fashion in which the type of pulser heretofore described may be used for the accumulation of numerical data in an assembly of counters of the type described. Staged counters of this type are illustrated at 80, 82, 84 and 86, there being one counter for each order. These counters are interconnected for carrying and have their terminals lettered to correspond with the lettered terminals in FIGURE 3. Each of the external inputs is shown as connected to a bank of switches 88 arranged to connect selectively the input terminals to the output terminals 90 of a pulser 92 of the type shown in FIGURE 5, there being indicated in FIGURE 6 the power supply terminal 58 for generating the pulses, the power supply terminals 76 for the clutch control and the starting switch button 78. The switches 88 may be of any desired type suitable for the purpose involved. They may, for example, be provided with individual actuating keys of a keyboard with conventional mechanical interlocks to prevent the depression of more than one key in an order. As will be evident from the diagram, if keys corresponding to the various digits in the different orders are depressed to close their switches (or if the switches are otherwise closed) a single cycle of operation of the pulser resulting from closure of the starting button 78 will produce in the counters simultaneous accumulation of all of the digital values determined by the switches, carrying between the orders being performed as already described. It is assumed, of course, that the supply of current available at terminal 58 will be sufficient to effect operations of the solenoids of all of the counters simultaneously if that is required by the operation involved.

Addition and subtraction may be selectively involved merely by shifting the switches 37 and 39 of the various counters, and these may be mechanically ganged and connected to the starting switch 78 so that addition and subtraction may be readily effected by depression of add or subtract keys. By the use of a readout system to transfer the readings of the counters shown in FIGURE 6 to other counters, and by suitable switchings, the operation from the standpoint of a machine operator may be essentially similar to that of conventional mechanical desk calculators, with performance of the fundamental operations of multiplication and division in addition to the ordinary addition and subtraction operations.

The system shown in FIGURE 6 may be used for presetting into counters any desired number if the presetting operation is preceded by zeroizing manually or by electrical means as hereafter described.

It will be also evident that by various interchanges of connections so that some counters may add and others simultaneously subtract there may be carried out a great variety of algebraic algorithms. The matter of transfer of readings from one set of counters to another may be carried out as will be now explained with reference to a special type of system illustrated in FIGURE 7.

Figure 7:
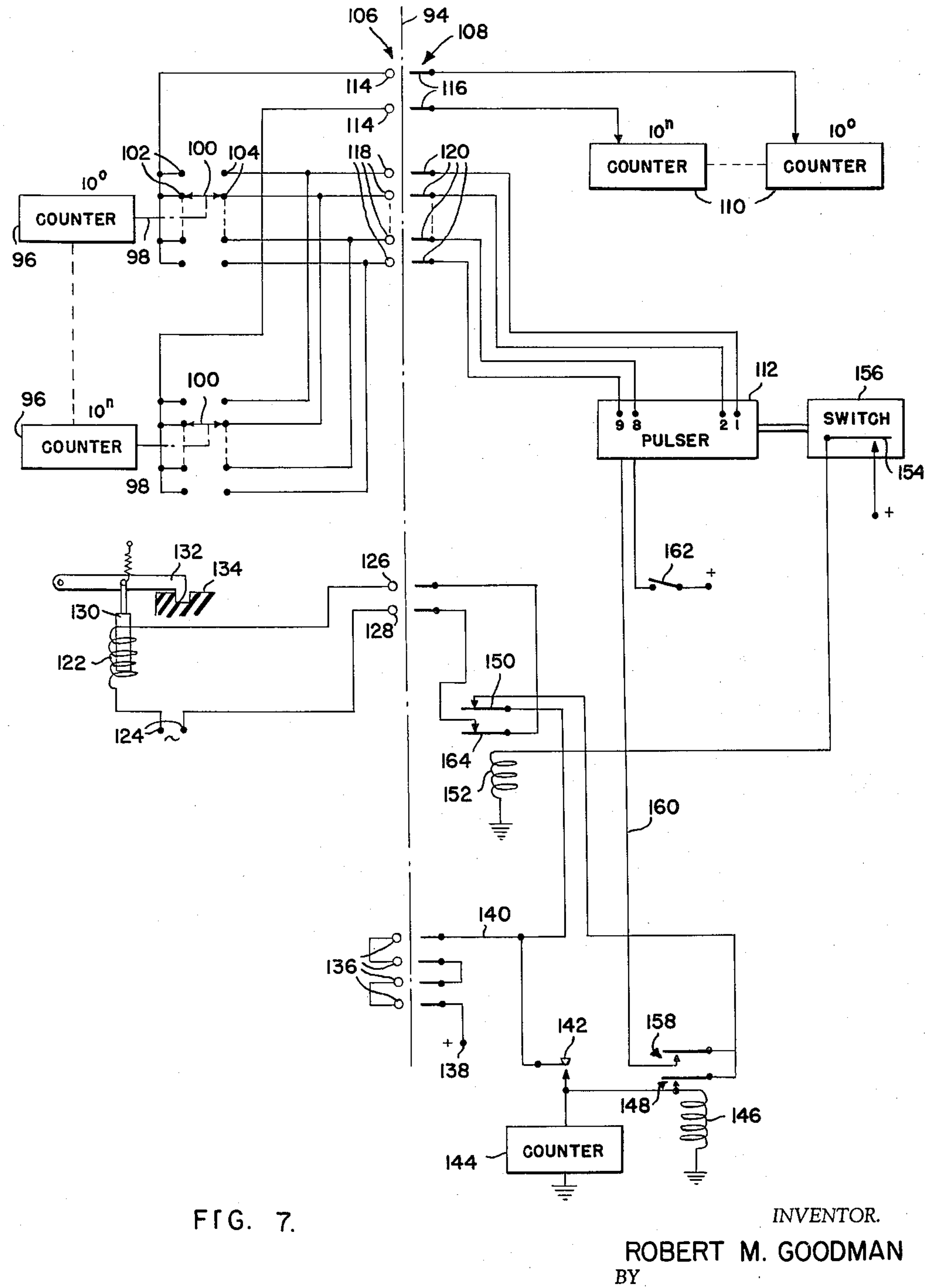
FIGURE 7 is a diagram illustrating a readout system.

FIGURE 7 specifically represents a system which may be used for reading out information from various counting or computing devices. For example, in a relatively simple form it may be used for accumulating the readings of operations of vending devices or the like. In such cases, widely scattered vending devices may be provided with one or more sets of counters accumulating unit by unit the operations of the devices. In the case of a vending machine, for example, dispensing various types of candy, cigarettes, or other commodities, there may be a separate counter assembly for each type of product dispensed. In other cases, a single counter assembly alone may be used to register the number of operations of the vending device irrespective of identification of different operations. Even more elaborately the devices from which readouts are desired may be cash registers, ticket issuing machines, or the like. In all of these instances is may be desirable to have some employee of the controlling company make the rounds periodically to accumulate from the various machines the total sales or values of single or multiple classes which have been accumulated. As description of FIGURE 7 proceeds, it will be evident that while it is shown in a simple form it may be indefinitely extended to more elaborate readout and accumulating operations.

To the left of the construction line indicated at 94 there are indicated the parts which are incorporated in the machines from which readouts are to be taken. To the right of this line 94 are the elements which may be incorporated in a box carried by the employee.

In each machine from which readouts are to be taken there may be a set of counters 96 corresponding to the set illustrated at the top of FIGURE 6. If mere accumulation of operations is involved, pulse inputs will be introduced only into the counter of 0 order. On the other hand, if the accumulations are to be monetary or otherwise multiple in different orders, the counters shown at 96 may be the same as those shown in FIGURE 6 with the same type of data entering devices including a pulser such as 92. Indicated at 98 are the shafts of the individual counters 96 containing shorting wipers 100 corresponding to 44 in FIGURE 4 arranged to bridge electrically the contacts 102 and 104 which are paired for the various digits. In this particular case, all of the contacts 102 of each counter order are connected together. At an available point on the machine there are sockets indicated generally at 106 which are arranged to be entered by pins indicated generally at 108 carried by a common plug. Inputs to counters 110 located in the readout apparatus are provided through the sockets 114 and plugs 116. The counters 110 may be of the type described herein being arranged for the various orders as heretofore described with provisions for carrying.

Nine sockets 118 are connected to the contacts 104 of the various counter orders, the connections being such that each socket 118 is connected to all of the contacts 104 corresponding to each digit. The plug pins 120 corresponding to these sockets are connected to the nine output terminals of a pulser 112 which is of the type illustrated in FIGURE 5. Following the connections shown in FIGURE 7 it will be evident that if the pins so far described are plugged into their sockets and the pulser is caused to operate through a single cycle the counters 110 will be operated so as to give a reading of the settings of the counters 96 without disturbance of the latter.

For the purposes here under consideration some additional devices are desirable. It should not be possible to pull the plug containing the pins 108 from its socket during an accumulating operation. For this purpose, a solenoid 122 having one terminal connected to a power supply terminal at 124 has its other terminal connected to a socket 126 associated with a companion socket 128 to which a return is made to the other terminal of the power supply. The solenoid 122 through a plunger 130 operates a latch 132 which, when the solenoid is energized is arranged to engage an opening in the wall of the plug 134 which carries the pins 108. Shorting of the sockets 126 is effected as hereafter described.

Some of the sockets of the group 106, namely those illustrated at 136, are provided to effect a coding to prevent unauthorized operations. As will now be evident, the plug and socket may take a conventional multiple pin form in which the pins and sockets may be arranged in a great number of combinations so that the locations of the sockets corresponding to 136 may be so many as to effectively prevent operation unless they are entered by particular pins of the group 108. To achieve this end, a supply terminal 138 is arranged to be connected to a lead 140 through a series arrangement of pins and sockets as will be evident from FIGURE 7, which series of connections will only be satisfied for a given socket setup if the pin set-up corresponds thereto. The connection 140 runs to a push button start switch 142 which when closed provides a pulse to a counter 144 which serves to indicate the number of accumulating operations involved. The same switch provides current through the winding 146 of a relay provided with the normally open contacts 148 which are connected through the normally closed contacts 150 of a relay having a winding at 152, these contacts leading back to the connection 140. As will be obvious from inspection, this arrangement merely provides a holding circuit for the relay winding 146 after a momentary depression of the starting button at 142. The relay winding 152 is energized by closure of a mechanical switch indicated at 156 which involves the contacts at 154. These contacts are normally opened, but are closed when the pulser completes a single cycle. The normally closed contacts 164 of the relay at 152 are connected to the pins adapted to enter the sockets 126 and 128. The relay at 146 has the normally open contacts 158 arranged to connect through contacts 150 the connection 140 to the motor and clutch operating connection 160 to the pulser. A reset switch 162 which is normally open is connected between line 160 and a power terminal which may be the same as that indicated at 138.

The operation of what has just been described is as follows:

When the plug of the reading device is inserted in the socket of the machine from which readout is to be secured, the first operation is that of shorting the sockets 126 and 128 to lock the plug in its inserted position so that it cannot be removed until the end of an accumulating operation. If the pin and socket arrangement at 136 is proper for an accumulation to take place, the connection 140 is energized. Assuming the pulser to have been previously reset by a momentary operation of switch 162 which may be in series with the contacts corresponding to 68 in FIGURE 5, which brings the pulser to the stopped condition illustrated in FIGURE 5 with the switch 154 open, operation may be initiated by momentary depression of the push button switch 142. This effects energization of relay 146 which is self locked as already indicated, and the closure of contacts 158 (which correspond to the switch 78 in FIGURE 5) effects the beginning of a cycle of the pulser. During this cycle the pulses emitted from the pulser 112 produce the same results as have already been described in connection with FIGURE 6, the bridging contacts at 100 and the associated wiring producing the same effects from the standpoint of completion of circuitry as the switches 88 in FIGURE 6. The result is accumulation of the readings of the counters 96 on the counters 110.

Following the ninth pulse of the counting series, the switch 156 is closed resulting in energization of the solenoid 152 which opens the contacts at 150 and thus deenergizes the magnetic clutch of the pulser at a point in its cycle at which the brush 60 has passed the ninth of the areas 54 but has not yet reached the tenth. In other words, the cycle of the pulser is not quite complete. At this same time, the contact at 164 is opened deenergizing the solenoid 122 so that the plug may be released. This completes the readout operation. Thereafter, before another readout operation the switch 162 is momentarily closed to bring the pulser to the beginning of its next cycle.

It will be evident that the arrangement described above with reference to FIGURE 7 may be very much elaborated by duplications of parts to attain multiple readouts of information and, if desired, even computation, the latter, by elaboration of the counter arrangements connected to terminals such as 116.

The counters herein described may be provided with the conventional mechanical resetting devices, but desirably electrical resetting is provided so as to be readily effected by means of an electrical signal delivered to a relay or otherwise routed to the counter. Furthermore, it may be desirable to reset a set of counters to a predetermined number rather than to zero, and hence it is desirable to utilize an arrangement such as illustrated in FIGURE 8 by which an arbitrary setting may be effected.

A set of counters is indicated by only two of them at 164 and 166, these counters being of the type shown in FIGURE 3 and having their terminals *a*, *b* and *c* designated to correspond with that figure. For the automatic resetting switches 168 are provided to open the carrying connections during the resetting operation. As will be evident, these switches and others about to be described may be ganged so as to be simultaneously operated when resetting is to be accomplished.

Figure 8:
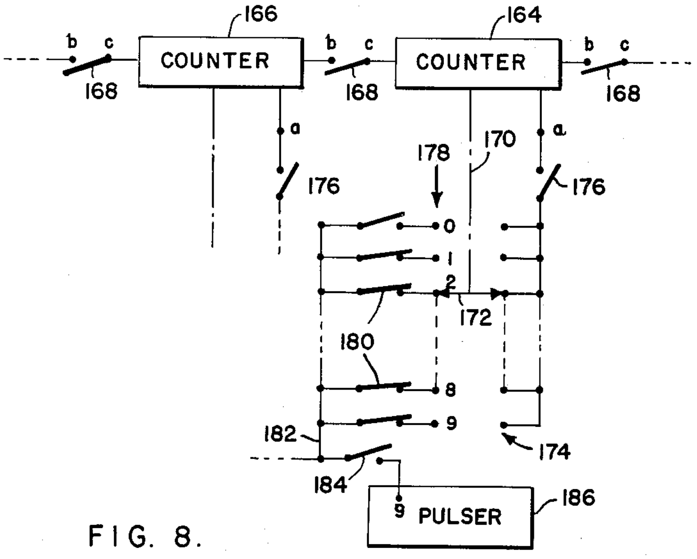
FIGURE 8 is a wiring diagram illustrating means for electrically resetting counters to a predetermined setting, for example, zero.

Since the individual counters of a set are reset, effectively, independently, there are illustrated in FIGURE 8 only the resetting connections associated with the counter 164, it being understood that similar connections are applied to the other counters of a group. The shaft of the counter 164 indicated at 170 is provided with an arm diagrammed at 172 corresponding to the contact short circuiting arm 44 shown in FIGURE 4. Of the paired contacts engageable by the arm 172, the series indicated at 174 are connected together and through a switch 176 which is closed during resetting to the terminal *a*. The other contacts 178 of the pairs are connected through individual switches 180 to a common lead 182 connected through a switch 184 to the terminal of pulser 186 which, in a cycle of operation, emits nine pulses. The pulser 186 may be of the type illustrated in FIGURE 5.

The resetting operation is as follows:

If resetting is to be to zero, the switch 180 corresponding to the zero contact 178 is open, the remaining switches 180 being closed. On the other hand, if resetting of the counter 164 is to be to another numeral, the switch 180 corresponding to that numeral is open, the others being closed. Considering switches 176 and 184 closed, with the switches 168 open, it will be evident that the counter 164 controls during its stepping through the short circuiting contact 172 pulses applied to its own input at *a*. Accordingly, if pulser 186 is operated through a cycle, stepping of the counter will automatically take place until the arm 172 engages the contact in the position in which the switch 180 is open. The various counters will, accordingly, come to rest in the respective positions predetermined by the opened switches 180 of the several counters. It may be noted that the counters may be stepped in either a forward or reverse direction to effect resetting.

It may be here noted that resetting may be accomplished without a pulser at 186 with the connection 182 applied to the operating potential source; however, this involves some aspect of repetity of operation and the possibility that an operating pawl may not be in position to engage another ratchet tooth when a pulse occurs due to stepping of the switch 172. Desirably, therefore, the pulser 186 is provided to secure definite timing of the pulses with proper intervals between them. It will be evident in the case of a decade counter only nine pulses are required as a maximum to effect any resetting.

The resetting arrangement does not necessarily require more elements than may be involved for other purposes such as accumulation and readout. The pulser 186, for example, may be the same pulser as indicated at 92 in the system shown in FIGURE 6, and the contact arm 172 may function for readout purposes as well as for resetting, the dual or multiple activities of these various parts being readily provided for merely by interposition in the circuit of proper switches. It may also be noted that the system shown in FIGURE 8 may provide particular numbers of pulses in various decades, which pulses are to be used for feeding other counters or devices. For example, by settings of switches 180 the various counters of a group may be preset to particular digits. Then, by opening the switches 180 corresponding to zero digits, the others being closed, the counters may be reversely stepped to emit at the lines 182 numbers of pulses corresponding to the presettings of the various orders. Such pulses may be taken from the connections 182 and utilized as desired.

Figure 9:
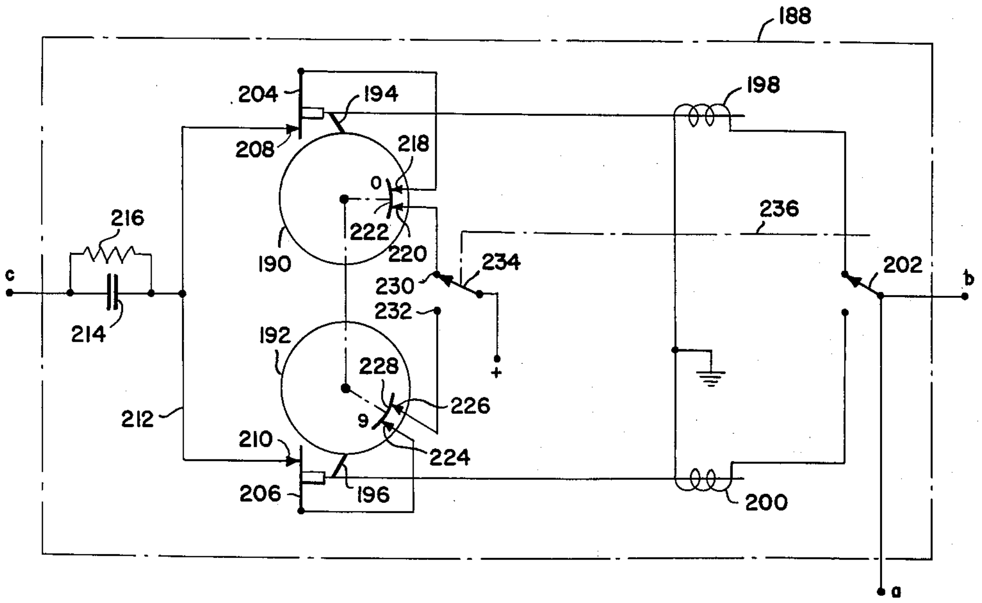
FIGURE 9 is a diagram similar to FIGURE 3 but showing an alternative means for effecting carrying.

Reference may now be made to FIGURE 9 which shows an alternative form of counter as contrasted with that illustrated in FIGURES 1, 2 and 3. In this previously described form of counter it will be noted that carrying between orders is dependent upon mechanical overthrow effecting the operations of switches by cams such as 26 and 28. Involved in this, is an aspect of timing to insure that when a carried pulse is emitted the counter order receiving it has its operating fall in position to give a step advance to a ratchet. In accordance with what is illustrated in FIGURE 9, carrying is restricted to a time when any pawl is in position to be operated properly by the carried pulse.

FIGURE 9 corresponds generally to FIGURE 3 and it will be understood that the mechanical arrangement may be similar to what is shown in FIGURE 1. To clarify the showing, the forward and reverse stepping ratchets are shown separately at 190 and 192, being arranged to be respectively stepped by their pawls 194 and 196 operated by the respective solenoids 198 and 200, selectively switched by the switch 202 to the terminals *a* and *b* corresponding to those previously described and respectively arranged to receive operating and carry pulses. A pair of switches 204 and 206 are provided with plungers engageable by the pawl-operating links when the pawls are in their rest positions, to engage fixed contacts 208 and 210. These contacts 208 and 210 are connected together at 212 and through a capacitor 214 to the carry terminal *c*. Capacitor 214 is shunted by a resistor 216 of relatively high resistance value so as to limit steady current delivered through terminal *c* to *a* value insufficient to energize a pawl-operating solenoid. The resistor 216 is arranged to effect substantially complete discharge of its associated capacitor 214 between the emission of carried pulses.

A contact 218 which is fixed in position is connected to the switch 204 and is associated with a second fixed contact 220, the contacts being arranged to be bridged by a contact 222 carried by the shaft of the ratchets. Bridging of contacts 218 and 220 occurs when the counter is in zero position. Similarly, the switch 206 is connected to a fixed contact 224 associated with a fixed contact 226, which contacts are arranged to be bridged by a contact 228 carried by the counter shaft when the counter is in the position 9. The contacts 220 and 226 are respectively connected to contact points 230 and 232 arranged to be selectively engaged by a switch 234 which is mechanically ganged as indicated at 236 with the switch 202. The two switches occupy upper positions during forward counting and lower positions during reverse counting.

The operation is as follows:

Assuming pulses entering the counter for counting in a forward direction, advance of the counter will be effected by pulse energization of the solenoid 198. As a transition from nine to zero occurs, the pawl 194 will be in its advanced position and when bridging of contacts 218 and 220 occurs the switch 204 will be open. When the pawl 194 returns to its rest position under the action of its spring, the switch 204 is closed. This provides a connection from the positive supply terminal connected to switch 234 through contact 230, contacts 220 and 218, and switch 204 to the capacitor 214 which charges with resultant provision of a current pulse through the terminal *c* to the solenoid 198 of the counter of the next higher order. In view of the fact that the operating pulses are timed and simultaneously delivered to the various counters, the pawl 194 of the counter of this next order will also be in its retracted position so that the pulse is received by its operating solenoid 198 when it is in position to effect a stepping action. Following the pulse search through the capacitor 214, charging this capacitor, the current flowing to the terminal *c* is limited by the relatively high resistor 216 to a low value insufficient to provide a pull on the subsequent solenoid which will retain its operating pawl advanced. The pawl accordingly is spring returned to its initial position in readiness for the reception of a counting pulse. On the next advance of the ratchet 190 the bridging of the contacts 218 and 220 is terminated. Since the circuit of the charged capacitor 214 is open so far as the subsequent solenoid is concerned, no operating pulse is emitted upon this breaking of the circuit. However, the capacitor 214 then discharges through the resistor 216 so that upon the occurrence of the next transition of the counter from nine to zero the capacitor is essentially discharged and again ready to pass a carry pulse. Corresponding operation occurs if the counters are operated in reverse direction.

It will be evident from the foregoing that the arrangement just described insures the emission of carry pulses only when the receiving counter has its parts positioned so that carrying may be effected. This is insured by the corresponding timing of the pulses delivered to the various orders as heretofore described.

The foregoing disclosure illustrates the general adaptability of pulse operated counters of the type illustrated in FIGURE 1, with or without readout devices of the type illustrated in FIGURE 4. It will be evident that by the use of these electromechanical elements, and particularly by association with a pulser such as illustrated in FIGURE 5, elaborate computing devices may be readily assembled with the advantage that many parts will be duplicated standard parts thus leading to savings in manufacturing costs. While such computers may not have the high speed of all-electronic computers, there are very many instances in which it is quite immaterial whether a computation takes place in a millisecond or a few seconds. Speeds are attainable of the order of those involved in purely mechanical computers. But whereas mechanical computers must generally be designed for individual purposes, the elements disclosed herein may be associated in quite arbitrary fashions merely by simple wiring, with particular advantages involved in many instances by the adoption of printed circuitry.

While the speed of elemental operations is necessarily limited by the presence of mechanically operating elements, it should be noted that by reason of the parallel operation of counters effective accumulation periods are very short and comparable with those involved in electronic computers operating serially. For example, assuming a counting rate as low as 10 per second, a 7 decade counter of the type herein disclosed may accumulate 9,999,999 starting at zero in 0.9 second.

It will be understood that the invention is not to be regarded as limited by the specific disclosure herein but only by the scope of the following claims.

What is claimed is:

1. A counting device comprising at least two counting elements each of which comprises a movable member and electromagnetically operating means having a cycle of operation effecting, in each cycle, a step advance of said movable member, each of such cycles having a first portion in which said means is energized and during which a step advance of said movable member is effected thereby followed by a second portion in which said means is deenergized to effect restoration of said means to an initial condition, said elements having corresponding cycles of operation, means effecting emission of an electrical pulse during the second portion of a cycle of one of said elements in which cycle a predetermined step advance of said member is effected, and means delivering said pulse directly to the other of said elements to energize the electromagnetically operating means of said other element during the second portion of the cycle of operation of said other element whereby said counting elements are adapted to receive simultaneous energizing pulses.

2. A counting element according to claim 1 in which said electrical pulse is emitted during a portion of the advance of said member following deenergization of said electromagnetically operating means.

3. A counting device according to claim 1 in which said electromagnetically operating means is adapted for operating said counting elements in forward and reverse directions.

4. A counting device comprising at least two counting elements each of which comprises a movable member and an electromagnetically operating means having a cycle of operation effecting, in each style, a step advance of said movable member, each of such cycles having a portion in which said means is energized and during which a step advance of said movable member is effected thereby followed by a portion in which said means is deenergized to effect restoration of said means to an initial condition, said elements having corresponding cycles of operation, means effecting emission of an electrical pulse during the last mentioned portion of a cycle of one of said elements in which cycle a predetermined step advance of its member is effected, means delivering said pulse directly to the other of said elements to energize the electromagnetically operating means of the other of said elements, and means for providing simultaneous energizing pulses to the electromagnetically operating means of both of said elements.

5. A counting device according to claim 4 in which said electrical pulse is emitted during a portion of the advance of the member of the first mentioned element following deenergization of the electromagnetically operating means thereof.

6. A counting device according to claim 4 in which said means for providing simultaneous energizing pulses provides a plurality of pulse output channels emitting different numbers of pulses with simultaneity of pulses emitted on the several channels.

7. A counting device according to claim 4 in which said electrical pulse is emitted during a portion of the advance of the member of the first mentioned element following deenergization of the electromagnetically operating means thereof and during the intermission between said energizing pulses.

8. A counting device according to claim 6 including means for selectively switching said output channels to said counting elements.

9. A counting device comprising a plurality of electromagnetically operated counters arranged in a series and for the effecting of carrying therebetween, and means for providing simultaneous electrical operating pulses to a plurality of said counters, means for emitting carry pulses during the intermission of said operating pulses, and means delivering said carry pulses between the counters as said pulses are emitted.

10. A counting device according to claim 9 in which said electromagnetically counters are adapted for operation in forward and reverse directions.

11. A counting device according to claim 9 in which said means for providing simultaneous electrical operating pulses provides a plurality of pulse output channels emitting different numbers of pulses with simultaneity of pulses emitted on the several channels.

12. A counting device according to claim 11 including means for selectively switching said output channels to said counters.

References Cited in the file of this patent

UNITED STATES PATENTS

| | | |
|---|---|---|
| 518,885 | Hollerith | Apr. 24, 1894 |
| 1,804,576 | Waite | May 12, 1931 |
| 1,955,043 | Yates et al. | Apr. 17, 1934 |
| 2,171,044 | Nelsen et al. | Aug. 29, 1939 |
| 2,300,954 | McMaster | Nov. 3, 1942 |
| 2,396,229 | Blakely | Mar. 12, 1946 |
| 2,416,369 | Avery | Feb. 25, 1947 |
| 2,471,150 | Goodale et al. | May 24, 1949 |
| 2,586,173 | Nelsen | Feb. 19, 1952 |
| 2,595,045 | Desch et al. | Apr. 29, 1952 |
| 2,600,144 | Watson | June 10, 1952 |
| 2,663,495 | Ramsell et al. | Dec. 22, 1953 |
| 2,700,076 | Goode | Jan. 6, 1955 |
| 2,930,529 | Laboissiere | Mar. 29, 1960 |